No. 686,294. Patented Nov. 12, 1901.
C. HAYNES.
PLOW ATTACHMENT.
(Application filed Apr. 4, 1901.)
(No Model.)
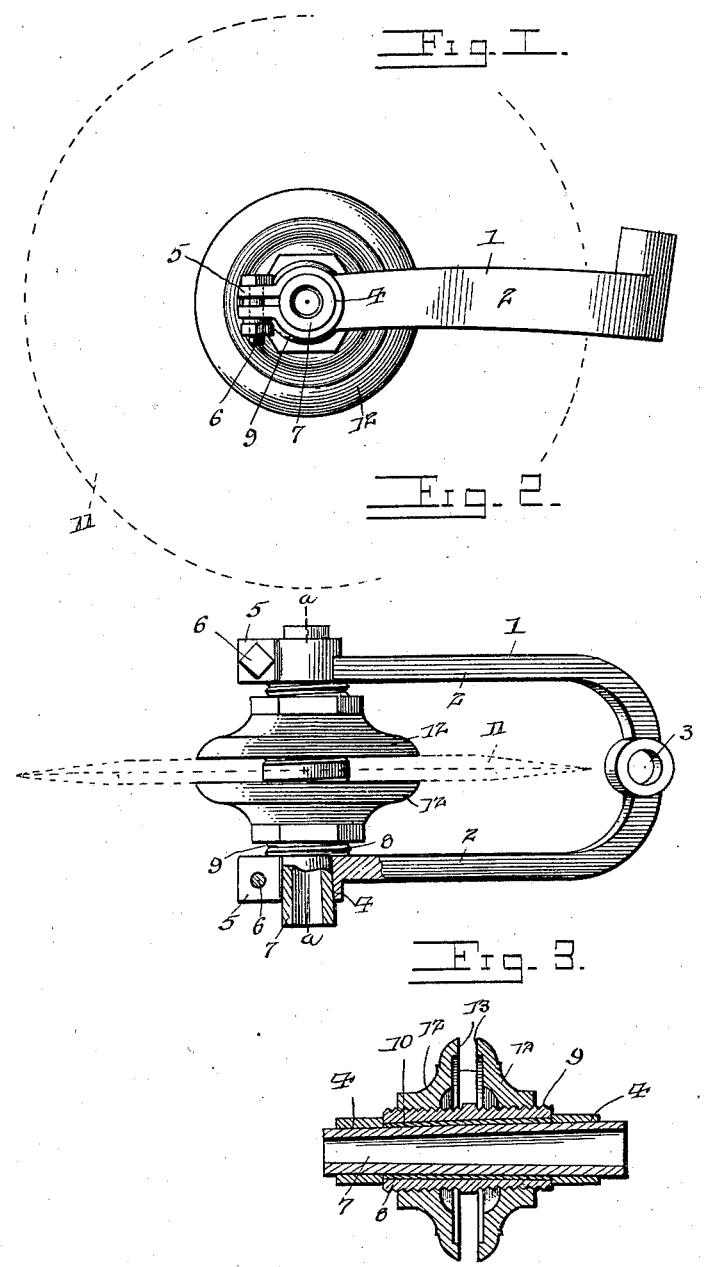
Witnesses
F. E. Alden.
J. W. Garner
C. Haynes Inventor
by C. A. Snow & Co.
Attorneys

UNITED STATES PATENT OFFICE.

CHESTER HAYNES, OF MISHAWAKA, INDIANA.

PLOW ATTACHMENT.

SPECIFICATION forming part of Letters Patent No. 686,294, dated November 12, 1901.

Application filed April 4, 1901. Serial No. 54,360. (No model.)

*To all whom it may concern:*

Be it known that I, CHESTER HAYNES, a citizen of the United States, residing at Mishawaka, in the county of St. Joseph and State of Indiana, have invented a new and useful Plow Attachment, of which the following is a specification.

My invention is an improved rolling colter for plows; and it consists in the peculiar construction and combination of devices hereinafter fully set forth, and pointed out in the claims.

One object of my invention is to effect improvements whereby the durability of the bearing of the rolling colter is enhanced.

A further object of my invention is to provide improved means for compensating for wear of the bearings.

A further object of my invention is to effect improvements in the means for securing the colter-disk on its bearing.

In the accompanying drawings, Figure 1 is a side elevation of a rolling colter and yoke for attaching the same to a plow-beam constructed in accordance with my invention. Fig. 2 is a top plan view of the same, partly in section. Fig. 3 is a sectional view of the same, taken on the line $a\ a$ of Fig. 2.

In the embodiment of my invention I provide a supporting-yoke 1, which is substantially in the form of the letter U and has the arms 2. At the front of the yoke is an opening 3 to receive a suitable bolt to secure the yoke pivotally under the beam of a harrow at a point in advance of the plowshare. The rear ends of the arms 2 are provided with openings 4, which are in line with each other, and the extreme rear ends of said arms are provided with binding lugs or ears 5. Clamping-bolts 6 in openings in the ears or lugs 5 are adapted to draw the latter toward each other to reduce the size of the openings 4, and thereby clamp the bearing-pin 7 firmly in the said openings. The said bearing-pin tapers throughout its length, and the openings 4 are similarly tapered. It will be understood that the bearing-pin connects the rear ends of the arms 2 of yoke 1 and is secured in the openings 4 against rotation. It will be also understood that by reason of the tapered form of said bearing-pin and said openings and by means of the spring lugs or ears 5, which form the upper and lower sides of the openings 4, and the clamping-bolt 6, which connects said lugs or ears, the bearing-pin may be adjusted in the direction of its length in the said openings 4.

A cylindrical sleeve 8 has its bearing on the tapered bearing-pin, the bore of the said cylindrical sleeve being correspondingly tapered, and said sleeve is provided with exterior screw-threads 9, extending from the ends nearly to the center thereof. The bore of the sleeve is lined with a bushing 10, which is made of chilled iron or any other suitable exceedingly-hard material, is of tapered form, and fits snugly on the tapered bearing-pin. The colter-disk 11 has a central opening, in which the central portion of the sleeve is fitted, and on the ends of the said sleeve are screwed the clamping-heads 12, which are provided on their inner sides with annular flanges 13, that bear on opposite sides of the colter-disk. Said clamping-heads serve to clamp the colter-disk firmly between them and secure the same firmly on the sleeve, which revolves on the bearing-pin.

The hardened bushing, as hereinbefore stated, is exceedingly durable and wears very slowly. From time to time the conical bearing-pin may be adjusted longitudinally in order to compensate for wear thereof and of the bushing. Hence the colter is provided with a bearing which never works loose and never permits the colter to wabble. The bushing in the sleeve being harder than the conical bearing-pin, most of the wear is on the latter, and during the life of the bearing-pin the latter may be adjusted from time to time, as hereinbefore stated, to compensate for wear. When the bearing-pin has become so worn as to be useless or inefficient, another may be substituted in its stead at very slight cost. Hence the life of the sleeve which turns on the bearing-pin and to which the colter-disk is secured is indefinitely prolonged.

Having thus described my invention, I claim—

1. The combination of a forked yoke having bearings in the arms thereof, a tapered bearing-pin, adjustable in the direction of its length in said bearings, means to secure said pin in said bearings, a sleeve having its bearing on said pin, between the bearings of the latter and a colter-disk secured on said sleeve, substantially as described.

2. The combination of the yoke, the tapered bearing-pin adjustably secured therein, the sleeve having its bearing on said tapered bearing-pin, and lined with a bushing of hardened material, and the colter-disk secured on said sleeve, substantially as described.

3. A bearing for the rolling colter of a plow, comprising a supporting-yoke, a tapered bearing-pin adjustably secured to the yoke, a bushing having its bearing on said conical bearing-pin, and clamping-heads on said bushing to secure the colter-disk between them, substantially as described.

4. A bearing for the rolling colter of a plow, comprising a supporting-yoke, a tapered bearing-pin adjustably secured therein, a bushing having its bearing on said tapered bearing-pin, and clamping-heads screwed on said bushing, to secure the colter-disk between them, substantially as described.

5. A bearing for the rolling colter of a plow, comprising a supporting-yoke, a bearing-pin secured therein against rotation, a bushing having its bearing on said bearing-pin, and clamping-heads secured on said bushing and adapted to clamp a colter-disk between them, said clamping-heads having the annular clamping-flanges on their opposing sides, substantially as described.

In testimony that I claim the foregoing as my own I have hereto affixed my signature in the presence of two witnesses.

CHESTER HAYNES.

Witnesses:
    JAMES A. BECKER,
    JOHN J. SCHINDLER.